United States Patent
Hansen et al.

(10) Patent No.: US 8,029,616 B2
(45) Date of Patent: *Oct. 4, 2011

(54) BULK MATERIAL COVER COMPOSITION

(75) Inventors: David L. Hansen, Ivins, UT (US); Dennis W. Super, Vestal, NY (US)

(73) Assignee: LSC Environmental Products, LLC, Apalachin, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/467,083

(22) Filed: May 15, 2009

(65) Prior Publication Data

US 2009/0226261 A1 Sep. 10, 2009

Related U.S. Application Data

(62) Division of application No. 11/459,771, filed on Jul. 25, 2006, now Pat. No. 7,544,243.

(51) Int. Cl.
*C04B 14/10* (2006.01)

(52) U.S. Cl. ........ 106/713; 106/644; 106/716; 106/718; 106/724; 106/730; 405/129.9; 405/129.95

(58) Field of Classification Search .................. 106/713, 106/644, 716, 718, 724, 730; 405/129.9, 405/129.95
See application file for complete search history.

(56) References Cited

U.S. PATENT DOCUMENTS

| 5,082,500 A | 1/1992 | Nachtman et al. | 106/900 |
| 5,161,916 A | 11/1992 | White et al. | 405/259.6 |
| 5,275,508 A * | 1/1994 | Hansen | 405/129.9 |
| 5,385,429 A * | 1/1995 | Hansen | 405/129.9 |
| 5,516,830 A | 5/1996 | Nachtman et al. | 524/446 |
| 5,525,009 A * | 6/1996 | Hansen | 405/129.9 |
| 7,544,243 B2 * | 6/2009 | Hansen et al. | 106/713 |
| 2002/0045074 A1 | 4/2002 | Yu et al. | 428/703 |

OTHER PUBLICATIONS

Restriction Requirement for related U.S. Appl. No. 11/459,771 mailed on Jun. 4, 2008.
Office Action for related U.S. Appl. No. 11/459,771, mailed on Aug. 25, 2008.
Office Action for related U.S. Appl. No. 11/459,771, mailed on Dec. 31, 2008.
Office Action for related U.S. Appl. No. 11/459,771, mailed Mar. 6, 2009.

* cited by examiner

*Primary Examiner* — Paul Marcantoni
(74) *Attorney, Agent, or Firm* — Heslin Rothenberg Farley & Mesiti P.C.

(57) ABSTRACT

A cover composition that can be applied to a bulk material pile, such as landfill refuse, to protect the pile from wind, precipitation, and access by animals and insects is provided. The cover composition is a mixture of a liquid, typically, water; bentonite clay; and synthetic fibers. The composition may be enhanced by the addition of one or more of the following additives: Portland cement, pregelatinized wheat starch, synthetic polymers, soda ash, and latex paint. Unlike prior art cover compositions, the disclosed composition adheres well to waste material, most notably plastics, whereby the composition is easy to apply and provides a substantially uniform, durable protective cover to landfill refuse piles and other bulk materials. Methods of applying the composition to bulk material piles are also disclosed.

20 Claims, No Drawings

BULK MATERIAL COVER COMPOSITION

CROSS REFERENCE TO RELATED APPLICATIONS

This application is a divisional application of U.S. application Ser. No. 11/459,771 filed Jul. 25, 2006 entitled "BULK MATERIAL COVER COMPOSITIONS AND METHODS FOR APPLYING", now U.S. Pat. No. 7,544,243, the disclosure of which is incorporated by reference herein in its entirety.

TECHNICAL FIELD

This invention relates to protective coverings for bulk material piles, for example, for waste piles. Particularly, the invention relates to sprayable cover materials for waste piles that provide a durable cover that minimizes odor emission and material movement.

BACKGROUND OF THE INVENTION

During the processing or storage of waste, for instance, residential or industrial waste, the waste may be concentrated into piles, for example, within landfills, compost windrows, and sludge heaps, among others. When waste is concentrated into piles, it is often necessary to cover the waste piles to minimize the emission of odor, prevent fires, prevent the movement of the waste, and/or prevent vectors such as birds, flies, and other insects from feeding on the waste. Typically, waste piles are covered by spreading a layer of dirt over the exposed portions of the waste piles. For example, in landfills, piles of municipal solid waste are typically covered by spreading a layer of dirt on the pile. The thickness of the layer depends upon the length of time the pile is to remain covered. For example, a waste pile that is to be covered for a short period of time, for example, overnight, may require, for example, a six-inch layer. However, when it is necessary to cover a waste pile for a relatively longer period of time, a twelve-inch layer may be required. For a permanent cover generally a layer of dirt of approximately two feet or more in thickness may be required.

One problem associated with the use of soil and dirt is that large quantities are necessary to cover these waste piles. For this reason, there is a high loss of available volume for waste thereby significantly reducing the amount of waste that can be concentrated into a pile. This is particularly true in landfills where waste piles are stacked upon other waste piles having daily soil covers separating each waste pile. Since there is concern over the effective space available in existing landfills, it has become necessary to maximize the volume available for waste. One way of accomplishing this is to minimize the volume of dirt necessary for covering the waste piles or to provide a cover material that substitutes for the dirt.

Several spray-on coatings have been developed to provide an effective cover to waste piles. These include the coatings described in U.S. Pat. Nos. 5,161,915; 5,275,508; 5,385,429; and 5,525,009 (the disclosures of which are incorporated by reference here in their entirety), which are marketed under the registered trademark POSI-SHELL by Landfill Service Corporation of Apalachin, N.Y. These cover materials typically comprise a mixture of water, mineral binder (such as cement kiln dust, "CKD," or similar materials), and fibers (both cellulose and synthetic) that can be sprayed on to a waste pile and allowed to set to provide an effective cover. These mineral-based covers have proven to provide effective covers to landfills and other waste piles.

However, though cover compositions having mineral binders such as described in the above patents have been proven to provide good cover adhesion and sufficient solids content to provide good opacity, the availably of mineral binders, such as CKD, has been markedly reduced. Changes in the process of manufacturing cement and the adoption of these mineral binders for other higher value applications have reduced the supply of such mineral binders or increased there cost whereby such binders are unavailable or cost prohibitive. In attempts to replace this supply of mineral binders some have used more expensive Portland cement or other mineral binders, such as coal fly ash. However, in addition to the expense, such substitute mineral binders typically can be difficult to obtain and the quality of the substitute that is available typically exhibits inconsistent properties. One aspect of the present invention provides a cover material that employs s mineral binder that is more readily available and more cost effective, while providing the desired consistency, adhesion, opacity, and durability in the material cover.

Other prior art cover materials, for example, those described in U.S. Pat. Nos. 5,082,500 and 5,516,830, are primarily fiber based. These fiber based cover materials also include clay and a polymer that aid in retaining the integrity of the fiber-based matrix. These prior art covers are predominantly fiber with minor amounts of clay binder. However, these fiber-based covers typically do not adhere well to low friction surfaces, for example, plastic containers, typically found in landfills, and thus their effectiveness as covering material can be significantly hampered. Since the fiber in the fiber-based covers tends to agglomerate or flocculate, it is inherently difficult to fluidize the fiber based slurry in order to pump and spay these fiber-containing products effectively. Accordingly, these fiber-based cover materials typically require inordinately large water content to prevent agglomeration of the fibers. However, the high water content produces a slurry that does not adhere well to refuse, most notably to plastic surfaces that are common in landfills. The tendency of such fiber-based cover materials to slide off landfill material typically requires that the material be applied repeatedly and with constant vigilance during application to areas where the cover thins or gaps appear. As a result, the application of such fiber-based covers can be problematic to ensure the desired material cover.

Moreover, the low solids content of such fiber-based cover materials provides a non-uniform cover that, when subjected to rain and wind, can lose its integrity. Typically, these limitations of the fiber-based covers may be overcome with the addition of expensive additives, such as cellulose polymers, to the mixture.

Aspects of the present invention overcome these and other limitations of the prior art and provide an effective bulk material pile cover that can be easily applied and maintained without the limitations and disadvantages of prior art material cover materials. Aspects of the present invention provide improved adhesion to landfill materials that are easier to apply with minimal concern for thinning and can be spray applied quickly and easily. Aspects of the invention also allow for easier and quicker equipment clean up.

SUMMARY OF THE INVENTION

The aforementioned benefits of the present invention are achieved by utilizing a cover for waste piles in accordance with the present invention. One aspect of the invention is a bulk material cover composition including at least 50 weight percent liquid; about 3 to about 18 weight percent bentonite clay; and at least some synthetic fiber. In one aspect the liquid comprises about 80 to about 95 weight percent water. In another aspect, the synthetic fiber comprises about 0.05 weight percent to about 2 weight percent synthetic fiber. In a further aspect the composition includes cement, for example, about 5 to about 45 weight percent Portland cement. The composition may also include an adhesive agent, such as pregelatinized wheat starch, and/or a coloring agent, such as mortar dye, and/or a water-conditioning agent, such as, soda ash, and/or latex paint.

Another aspect of the invention is a method of providing a cover to bulk material pile, the method including combining at least 50 weight percent liquid, about 3 to about 18 weight percent bentonite clay; and at least some synthetic fiber to produce a slurry of liquid, bentonite clay, and synthetic fiber; spraying the slurry onto the bulk material pile; and allowing the slurry to harden to provide a cover to at least some of the bulk material pile. In one aspect, about 80 weight percent to about 95 weight percent liquid is used. In another aspect, about 55 weight percent to about 85 weight percent liquid is used and the method further comprises introducing at least some cement to the slurry.

A further aspect of the invention is a material that can be mixed with a liquid to provide a bulk material cover composition or at least a constituent of a bulk material cover composition, the material comprising bentonite clay and at least some pregelatinized wheat starch. In one aspect, the material comprises at least 80 weight percent bentonite clay and at least 1 weight percent pregelatinized wheat starch. In one aspect, the material may comprise about 90 to about 99 weight percent bentonite clay and about 1 to about 10 weight percent pregelatinized wheat starch. In a further aspect, the material may comprise about 95 to about 99 weight percent bentonite clay and about 1 to about 5 weight percent pregelatinized wheat starch. The material may also include a water-conditioning agent, such as, soda ash; and/or a synthetic polymer; and/or synthetic fibers. The material provided may be one marketed under the trademark PSM-200™ setting agent by Landfill Service Corporation. A further aspect of the invention is a method of providing a cover to a bulk material pile, the method including combining the material recited above with a liquid to produce a slurry of material and liquid; spraying the slurry onto the bulk material pile; and allowing the slurry to harden to provide a cover to at least some of the bulk material pile. In one aspect, the method further comprises mixing at least some fibrous material with the material and liquid, for example, synthetic fibrous material.

These and other aspects, features, and advantages of this invention will become apparent from the following detailed description of the various aspects of the invention.

DETAILED DESCRIPTION OF THE INVENTION

The cover composition for waste piles in accordance with aspects of the present invention may be used to cover a variety of waste piles, for example, compost windrows, sludge heaps, and municipal solid waste piles in landfills. Aspects of the invention may also be used to cover non-waste-type material, for example, stockpiles of sand, mulch, topsoil, cement, contaminated soil, mine tailings, coal, cement clinker, or chemical or mechanical process intermediates, and the like, to protect the contents of the pile from, for example, precipitation or wind, among other things. However, in order to facilitate the description of aspects of the present invention, the following discussion will primarily refer to the present invention as it is applied to cover waste piles, for example, municipal solid waste piles in landfills. It will be apparent to those of skill in the art, that the cover composition and application process described may also be applied for other uses, for example, non-waste uses.

The composition of one aspect of the invention is listed in Table 1. Contrary to prior art cover compositions, for example, those disclosed in U.S. Pat. Nos. 5,082,500 and 5,516,830, the aspect of the invention identified in Table 1 does not require fibrous material to provide the bulk solids, but provides bentonite clay as the major solid constituent with the addition of fibers, for example, specialized synthetic fibers, to reinforce the bentonite clay matrix. Bentonite clay has the advantageous property of swelling when wetted, for example, with water. For instance, bentonite may swell as much as sixteen-fold in volume when mixed with water. This swelling of bentonite clay can dramatically increase the viscosity of a mixture to which bentonite clay is added. The inventors have found that this swelling property of bentonite clay can be very useful when applying and maintaining a waste pile cover. For example, unlike prior art compositions, the use of bentonite clay permits the use of increased volumes of liquid that, as a result, provide a more easily applied, for example, sprayed, composition.

TABLE 1

Typical Content of Cover Composition Prior to Application According to One Aspect of the Invention

| Constituent | Quantity (weight percent) |
|---|---|
| Liquid | 80 to 95 |
| Bentonite Clay | 3 to 18 |
| Synthetic Fibers | At least some |

According to aspects of the invention, the liquid may be water, landfill leachate, industrial wastewater, or combinations thereof, or any other source of water that is readily available, among other liquids that may be used. For example, when the present invention is used to cover a landfill having a leachate stream, the leachate, treated or untreated, may be used as the source of liquid. Though a weight percent ranging from about 80% to about 95% is shown in Table 1, in one aspect, the weight percent may range from about 90% to about 95% and still provide an effective cover. In one aspect of the invention, the weight of the liquid may be at least about 9,000 pounds. For example, in one aspect, as indicated in Table 2, the weight of the liquid in a mixture may vary from about 9,000 pounds to about 18,000 pounds; for instance, the weight of the liquid may vary from about 14,000 pounds to about 17,000 pounds of liquid. It will be apparent to those skilled in the art that larger or smaller contents of liquid may be provided in aspects of the invention while, for example, remaining within the weight percentages that appear in Table 1.

TABLE 2

Typical Content of Cover Composition Prior to Application According to Another Aspect of the Invention

| Constituent | Quantity (Pounds) |
|---|---|
| Liquid | 9,000 to 18,000 |
| Bentonite Clay | 500 to 1,500 |
| Synthetic Fibers | 10 to 200 |

Though many forms of bentonite clay may be used in aspects of the invention, the bentonite clay may comprise commercial bentonite clay, for example, Hi-Yield bentonite provided by Wyo-Ben of Billings, Mont., or its equivalent. Bentonite clay enhances the smoothness and consistency of the mixture and also increases its tackiness and viscosity enabling it to better adhere to waste and cohere to itself. In one aspect, the bentonite clay may be finely ground bentonite, for example, bentonite provided in the form of PSM-200™ setting agent provided by Landfill Service Corporation. PSM-200 setting agent typically contains finely ground natural bentonite clay (for example, which can pass through a minus 200 sieve); a synthetic polymer, for example, less than 10% synthetic polymer by weight; pregelatinized wheat starch and soda ash. PSM-200 setting agent is described in a Material Safety Data Sheet and marketing material provided by Landfill Service Corporation (the disclosures of which are incorporated by reference herein.)

Though a weight percent of bentonite clay ranging from about 3% to about 18% may be provided in one aspect, as indicated in Table 1, the weight percent of bentonite clay may vary from about 5% to about 10%. In one aspect of the invention, at least 500 pounds of bentonite clay may be provided. For example, as shown in Table 2, the weight of the bentonite clay may vary from about 500 to about 1500 pounds, for example, between about 900 pounds and about 1200 pounds of bentonite clay. Accordingly, the weight of the synthetic polymer, for example, when the bentonite is provided in the form of PSM-200 setting agent, may vary from about 5 pounds to about 150 pounds, for example, between about 10 pounds and about 100 pounds of synthetic polymer. It will be apparent to those skilled in the art that larger or smaller contents of bentonite clay may be provided in aspects of the invention while, for example, remaining within the weight percentages that appear in Table 1.

Though some prior art cover compositions may include bentonite clay, the bentonite clay in prior art compositions is present as a minor additive to the base solid constituent, typically, cellulosic fibrous material, such as shredded newspaper. Unlike the present invention, the prior art does not utilize bentonite clay as a major constituent of the cover composition. According to aspects of the present invention, the bentonite clay provides an effective replacement for expensive Portland cement and cement kiln dust and provides a durable bulk material cover that is easier to apply and maintain.

The synthetic fibers enhance the integrity of the composition, for example, as the composition dries, the synthetic fibers minimize or prevent the separation or cracking of the clay and, if present, the cement (see below.) Unlike prior art covers which rely on fibrous material for their bulk and opacity, aspects of the present invention include less fibrous material, for example, very little fibrous material (as indicated by the content of synthetic fiber identified in Tables 1 and 2). In aspects of the present invention, bulk and opacity are provided by the bentonite clay and, if present, cement.

The synthetic fibers may comprise any synthetic material that is compatible with the clay and liquid. For example, the synthetic fibers may be made from a polyamide (PA), for example, nylon; a polyamide-imide; a polyethylene (PE); a polypropylene (PP); a polyester (PE); a polytetrafluoroethylene (PTFE); an acrylonitrile butadiene styrene (ABS); a polycarbonate (PC); or a vinyl, such as, polyvinylchloride (PVC), among other plastics. The synthetic fibers may be dimensioned by "denier," which is a unit expressing the mass of a fiber divided by the fiber's length, specifically, 1 denier is equal to 1 gram per 9000 meters of length of fiber. For example, the synthetic fibers may have deniers of typically about 1.0 denier to about 5.0 denier. In one aspect, the synthetic fibers comprise polyester fibers, for example, 1.5 denier polyester fibers. The polyester fibers may be coated with a compound that minimizes or prevents agglomeration of the fibers (that is, promotes dispersal) in an aqueous slurry, for example, in one aspect, the fibers may be fibers marketed under the trade name P-100 coated polyester fibers by Landfill Service Corporation, and described in an MSDS and marketing material provided by Landfill Service Corporation (incorporated by reference herein). Though as indicated in Table 1, one aspect of the invention includes at least some synthetic fiber, the weight percent of synthetic fiber may range from about 0.05% to about 2%, for example, from about 0.1% to about 1%. In one aspect of the invention, as indicated in Table 2, at least about 10 pounds of synthetic fiber may be provided. For example, as shown in Table 2, the weight of the synthetic fiber may vary from about 10 pounds to about 200 pounds, for example, between about 30 pounds and about 100 pounds of synthetic fiber. It will be apparent to those skilled in the art that larger or smaller contents of synthetic fiber may be provided in aspects of the invention while, for example, remaining within the weight percentages that appear in Table 1.

In addition to the absolute weights shown in Table 2, aspects of the invention may also be expressed in weight percents shown in Table 3. The compositions identified in Tables 1-3 produce a tough, leathery cover over material when dried.

TABLE 3

Another Typical Content of a Cover Composition Prior to Application According to One Aspect of the Invention.

| Constituent | Quantity (weight percent) |
|---|---|
| Liquid | 90 to 95 |
| Bentonite Clay | 5 to 10 |
| Synthetic Fibers | 0.10 to 1 |

Two examples of constituents of cover compositions according to aspects of the invention are listed in Table 4.

TABLE 4

Example Content of Cover Compositions Prior to Application According to Further Aspects of the Invention

| Constituent | Example 1 (Pounds) | Example 2 (Pounds) |
|---|---|---|
| Liquid | 15,000 | 15,000 |
| Bentonite Clay | 900 | 1,200 |
| Synthetic Fibers | 30 | 90 |

In one aspect of the invention, the cover composition may also include at least some cement, for example, Type I or Type II Portland cement. In one aspect, at least 500 pounds of cement may be added to the compositions listed in Tables 1-26. The cement may be added to promote quicker hardening of the composition when applied to a refuse pile, for example, to prevent dislocation of the cover due to wind or precipitation. The content of cement may vary from about 500 pounds to about 15,000 pounds, but may typically be provided in a range of about 2,000 pounds to about 10,000 pounds. With the addition of cement, other aspects of the invention are listed in Table 5 in terms of weight percent and in Table 6 in terms of absolute pounds of constituents. It will be apparent to those skilled in the art that larger or smaller contents of cement may be provided in aspects of the invention while, for example, remaining within the weight percentages that appear in Table 5.

TABLE 5

Another Typical Content of Cover Composition Prior to
Application According to One Aspect of the Invention.

| Constituent | Quantity (weight percent) |
| --- | --- |
| Liquid | 50 to 90 |
| Bentonite Clay | 3 to 12 |
| Synthetic Fibers | 0.05 to 2 |
| Cement | 5 to 45 |

In one aspect, the liquid listed in Table 5 may comprise from about 55 weight percent to about 85 weight percent water, the bentonite clay may comprise from about 4 weight percent to about 10 weight percent bentonite clay, the synthetic fibers may comprise from about 0.1 to about 0.5 weight percent synthetic fibers, and the cement may comprise from about 10 to about 40 weight percent Portland cement.

TABLE 6

Another Typical Content of Cover Composition Prior to
Application According to One Aspect of the Invention.

| Constituent | Quantity (pounds) |
| --- | --- |
| Liquid | 9,000 to 18,000 pounds |
| Bentonite Clay | 500 to 1,500 pounds |
| Synthetic Fibers | 10 to 200 pounds |
| Cement | 500 to 15,000 pounds |

Two examples of constituents of cover compositions according to aspects of the invention are listed in Table 7.

TABLE 7

Example Content of Cover Compositions Prior to Application
According to Further Aspects of the Invention

| Constituent | Example 3 (Pounds) | Example 4 (Pounds) |
| --- | --- | --- |
| Liquid | 11,600 | 15,000 |
| Bentonite Clay | 900 | 1,200 |
| Synthetic Fibers | 30 | 90 |
| Portland Cement | 2,000 | 10,000 |

An adhesive agent may also be included in the composition, for example, wheat starch may be introduced, for instance, pregelatinized wheat starch. The addition of wheat starch to the composition enhances the adhesion of the composition to itself and to the material being covered. In one aspect, at least 10 pounds of pregelatinized wheat starch may be added to the compositions listed in Tables 1-26. The content of pregelatinized wheat starch may vary from about 0.1 weight percent to about 2 weight percent in Tables 1-7, but may typically be provided in a range of about 0.2 weight percent to about 1.4 weight percent. In terms of pounds, the pregelatinized wheat starch may be provided from about 10 pounds to about 400 pounds to one or more of the compositions listed in Tables 1-7, but is typically provided from about 50 pounds to about 200 pounds. It will be apparent to those skilled in the art that larger or smaller contents of pregelatinized wheat starch may be provided in aspects of the invention while, for example, remaining within the weight percentages that appear in Tables 8 and 10.

In one aspect, the pregelatinized wheat starch may be Gen-vis 700 pregelatinized wheat starch provided by Archer Daniels Midland of Decatur, Ill., or its equivalent. With the addition of pregelatinized wheat starch, other aspects of the invention are listed in Tables 8, 9, 10, and, 11.

TABLE 8

Another Typical Content of a Cover Composition Prior
to Application According to One Aspect of the Invention
with Pregelatinized Wheat Starch.

| Constituent | Quantity (weight percent) |
| --- | --- |
| Liquid | 80 to 95 |
| Bentonite Clay | 3 to 18 |
| Synthetic Fibers | 0.05 to 2 |
| Pregelatinized Wheat Starch | 0.10 to 2 |

TABLE 9

Another Typical Content of a Cover Composition Prior
to Application According to One Aspect of the Invention
with Pregelatinized Wheat Starch.

| Constituent | Quantity |
| --- | --- |
| Liquid | 9,000-18,000 pounds |
| Bentonite Clay | 500-1,500 pounds |
| Synthetic Fibers | 10-200 pounds |
| Pregelatinized Wheat Starch | 10-400 pounds |

TABLE 10

Another Typical Content of a Cover Composition Prior
to Application According to One Aspect of the Invention
with Pregelatinized Wheat Starch.

| Constituent | Quantity (weight percent) |
| --- | --- |
| Liquid | 50 to 90 |
| Clay | 3 to 18 |
| Synthetic Fibers | 0.05 to 2 |
| Portland Cement | 5 to 45 |
| Pregelatinized Wheat Starch | 0.10 to 2 |

TABLE 11

Another Typical Content of a Cover Composition Prior
to Application According to One Aspect of the Invention
with Pregelatinized Wheat Starch.

| Constituent | Quantity |
| --- | --- |
| Liquid | 9,000-18,000 pounds |
| Bentonite Clay | 500-1,500 pounds |
| Synthetic Fibers | 10-200 pounds |
| Portland Cement | 2,000-10,000 |
| Pregelatinized Wheat Starch | 10-400 pounds |

In one aspect, it is preferable that the cover may be sufficiently opaque, for example, to conceal the contents of the pile, or to provide a substantially uniformly colored cover. A coloring agent may be added to the compositions listed in Tables 1-26 to provide the desired opacity or to provide an aesthetically pleasing shade of color to the composition. In one aspect, the coloring agent may comprise any conventional coloring agent, for example, a mortar dye, for instance, TRUE-TONE® mortar dye provided by Davis Color Corporation, may be added if desired, though other coloring agents may be used. According to one aspect, at least 10 pounds of coloring agent may be added to any one of the formulations listed in Tables 1-26. In one aspect, from about 0.05 weight percent to about 2 weight percent coloring agent may be added to the composition, for example, from about 0.1 to about 0.8 weight percent coloring agent may be added. In one aspect, about 10 pounds to about 300 pounds of coloring agent may be provided, for instance, about 20 to about 60 pounds of coloring agent may be added, for example, mortar dye, to the formulations listed in Tables 1-26. It will be apparent to those skilled in the art that larger or smaller contents of coloring agent may be provided in aspects of the invention while, for example, remaining within the weight percentages that appear in Tables 12 and 14. Some representative formulations including coloring agent are listed in Tables 12, 13, 14, and 15.

TABLE 12

Another Typical Content of a Cover Composition Prior to Application According to One Aspect of the Invention with Coloring Agent

| Constituent | Quantity (weight percent) |
|---|---|
| Liquid | 80 to 95 |
| Bentonite Clay | 3 to 18 |
| Synthetic Fibers | 0.05 to 2 |
| Coloring Agent | 0.05 to 2 |

TABLE 13

Another Typical Content of a Cover Composition Prior to Application According to One Aspect of the Invention with Coloring Agent.

| Constituent | Quantity |
|---|---|
| Liquid | 9,000-18,000 pounds |
| Bentonite Clay | 500-1,500 pounds |
| Synthetic Fibers | 10-200 pounds |
| Coloring Agent | 10-300 pounds |

TABLE 14

Another Typical Content of a Cover Composition Prior to Application According to One Aspect of the Invention with Coloring Agent.

| Constituent | Quantity (weight percent) |
|---|---|
| Liquid | 50 to 90 |
| Bentonite Clay | 3 to 18 |
| Synthetic Fibers | 0.05 to 2 |
| Portland Cement | 5 to 45 |
| Coloring Agent | 0.05 to 2 |

TABLE 15

Another Typical Content of a Cover Composition Prior to Application According to One Aspect of the Invention with Coloring Agent.

| Constituent | Quantity |
|---|---|
| Liquid | 9,000-18,000 pounds |
| Bentonite Clay | 500-1,500 pounds |
| Synthetic Fibers | 10-200 pounds |
| Portland Cement | 2,000-10,000 |
| Coloring Agent | 10-300 pounds |

Examples of constituents of cover compositions including pregelatinized wheat starch and a coloring agent, for example, mortar dye, according to aspects of the invention are listed in Tables 16 and 17.

TABLE 16

Example Content of Cover Compositions Prior to Application According to Further Aspects of the Invention with Pregelatinized Wheat Starch and Coloring Agent

| Constituent | Example 5 (Pounds) | Example 6 (Pounds) |
|---|---|---|
| Liquid | 15,000 | 15,000 |
| Bentonite Clay | 900 | 1,200 |
| Synthetic Fibers | 30 | 90 |
| Pregelatinized Wheat Starch | 50 to 200 | 50 to 200 |
| Mortar Dye | 20 to 60 | 20 to 60 |

TABLE 17

Example Content of Cover Compositions Prior to Application According to Further Aspects of the Invention with Pregelatinized Wheat Starch and Coloring Agent

| Constituent | Example 7 (Pounds) | Example 8 (Pounds) |
|---|---|---|
| Liquid | 11,600 | 15,000 |
| Bentonite Clay | 900 | 1,200 |
| Synthetic Fibers | 30 | 90 |
| Portland Cement | 2,000 | 10,000 |
| Pregelatinized Wheat Starch | 50 to 200 | 50 to 200 |
| Mortar Dye | 20 to 60 | 20 to 200 |

In another aspect, a water-conditioning agent, for example, at least some soda ash, may be added to the compositions described above and listed in Tables 1-26. Soda ash, that is, $Na_2CO_3$, which is also known as "sodium carbonate" or "washing soda," may be introduced to the compostions to improve the efficiency of the wetting of the bentonite clay. For example, soda ash may improve the "gelling" or the expansion of the bentonite clay whereby the viscosity of the composition increases. This property of soda ash may be particularly useful when hard water is used as the source of liquid for the composition. In some instances, according to the invention, the effect of the presence of soda ash on the viscosity of the composition may be such that the content of bentonite clay may be reduced, in comparison to the content of bentonite clay required to provide a given viscosity when soda ash is not present.

According to one aspect, soda ash may be introduced at least 2 weight percent of the bentonite clay used in the composition, for example, about 2 weight percent to about 10 weight percent of the bentonite clay used, for instance, from about 2 weight percent to about 6 weight percent of the bentonite clay used. For example, in one aspect, the soda ash may comprise from about 0.05 weight percent to about 4 weight percent of the entire composition, for instance, the soda ash may comprise from about 1 weight percent to about 2 weight percent of the entire composition. In one aspect, at least 10 pounds of soda ash may be used, for example, from about 10 to about 150 pounds of soda ash depending upon the content of the composition. Some representative formulations including soda ash are listed in Tables 18, 19, 20, 21, and 22. It will be apparent to those skilled in the art that larger or smaller contents of soda ash may be provided in aspects of the invention while, for example, remaining within the weight percentages that appear in Tables 20 through 22.

TABLE 18

Another Typical Content of a Cover Composition Prior to Application According to One Aspect of the Invention with Soda Ash.

| Constituent | Quantity (weight percent) |
|---|---|
| Liquid | 80 to 95 |
| Bentonite Clay | 3 to 18 |
| Synthetic Fibers | 0.05 to 2 |
| Pregelatinized Wheat Starch | 0.10 to 2 |
| Soda Ash | 0.05 to 2 |

TABLE 19

Another Typical Content of a Cover Composition Prior to Application According to One Aspect of the Invention with Soda Ash.

| Constituent | Quantity (weight percent) |
|---|---|
| Liquid | 50 to 90 |
| Bentonite Clay | 3 to 18 |
| Synthetic Fibers | 0.05 to 2 |
| Portland Cement | 5 to 45 |
| Soda Ash | 0.05 to 2 |

TABLE 20

Another Typical Content of a Cover Composition Prior to Application According to One Aspect of the Invention with Soda Ash.

| Constituent | Quantity |
|---|---|
| Liquid | 9,000-18,000 pounds |
| Bentonite Clay | 500-1,500 pounds |
| Synthetic Fibers | 10-200 pounds |
| Portland Cement | 2,000-10,000 |
| Soda Ash | 10-150 pounds |

TABLE 21

Example Content of Cover Compositions Prior to Application According to Further Aspects of the Invention with Pregelatinized Wheat Starch and Soda Ash

| Constituent | Example 9 (Pounds) | Example 10 (Pounds) |
|---|---|---|
| Liquid | 15,000 | 15,000 |
| Bentonite Clay | 900 | 1,200 |
| Synthetic Fibers | 30 | 90 |
| Pregelatinized Wheat Starch | 50 to 200 | 50 to 200 |
| Soda Ash | 18 to 90 | 24 to 120 |

TABLE 22

Example Content of Cover Compositions Prior to Application According to Further Aspects of the Invention with Pregelatinized Wheat Starch and Soda Ash

| Constituent | Example 11 (Pounds) | Example 12 (Pounds) |
|---|---|---|
| Liquid | 11,600 | 15,000 |
| Bentonite Clay | 900 | 1,200 |
| Synthetic Fibers | 30 | 90 |

TABLE 22-continued

Example Content of Cover Compositions Prior to Application According to Further Aspects of the Invention with Pregelatinized Wheat Starch and Soda Ash

| Constituent | Example 11 (Pounds) | Example 12 (Pounds) |
|---|---|---|
| Portland Cement | 2,000 | 10,000 |
| Pregelatinized Wheat Starch | 50 to 200 | 50 to 200 |
| Soda Ash | 18 to 90 | 24 to 120 |

In one aspect, latex paint may be added to the compositions listed in any one of Tables 1-26. The inventors have found that the addition of latex paint, for example, waste latex paint, to the compositions described above enhances the performance of the cover compositions. For example, in one aspect, the addition of latex paint increases the viscosity of the cover composition prior to application whereby other solid constituents, for example, clay and cement, may be reduced. In addition, the inventors have found that the presence of latex paint improves one or more of the opacity, adhesiveness, and flexibility of the cured coating after application.

As noted, one advantageous source of latex paint is waste latex paint, for example, waste household, commercial, or industrial latex paint, though new, unused latex paint may also be used. It is well known that waste household latex paint, for example, waste latex paint accumulated through waste collection activities, can pose significant and costly disposal problems for large and small municipalities and industries. However, according to aspects of the present invention, waste latex paint may be used to enhance the performance of, for example, municipal landfill covers, and also provide significant economic benefits for the municipality or industry by reducing the cost of latex paint disposal and/or treatment. That is, by introducing waste latex paint to their landfill cover compositions to enhance their landfill covers, municipalities and industries avoid the cost of disposing of or treating waist latex paint.

According to one aspect, at least 10 pounds of latex paint may be added to any one of the formulations listed in Tables 1-26. The latex paint may be of any color, but when waste paint is used, the waste paint may typically be grey or tan in color due to the mixture of paints of two or more colors, typically many colors. In one aspect, from about 1 weight percent to about 10 weight percent latex paint may be added to the composition, for example, from about 2 to about 8 weight percent latex paint may be added, for instance from about 2 weight percent to about 6 weight percent latex paint. In one aspect, about 10 pounds to about 2000 pounds of latex paint may be provided, for instance, about 50 to about 1000 pounds of latex paint may be added, for example, to the formulations listed in Tables 1-22. Some representative formulations including latex paint are listed in Tables 23, 24, 25, and 26. It will be apparent to those skilled in the art that larger or smaller contents of latex paint may be provided in aspects of the invention while, for example, remaining within the weight percentages that appear in Tables 23 and 25.

TABLE 23

Another Typical Content of a Cover Composition Prior to Application According to One Aspect of the Invention with Latex Paint

| Constituent | Quantity (weight percent) |
| --- | --- |
| Liquid | 80 to 95 |
| Bentonite Clay | 3 to 9 |
| Synthetic Fibers | 0.05 to 2 |
| Latex Paint | 1 to 10 |

TABLE 24

Another Typical Content of a Cover Composition Prior to Application According to One Aspect of the Invention with Latex Paint

| Constituent | Quantity |
| --- | --- |
| Liquid | 6,000-12,000 pounds |
| Bentonite Clay | 250-750 pounds |
| Synthetic Fibers | 10-100 pounds |
| Latex Paint | 10-1000 pounds |

TABLE 25

Another Typical Content of a Cover Composition Prior to Application According to One Aspect of the Invention with Latex Paint

| Constituent | Quantity (weight percent) |
| --- | --- |
| Liquid | 50 to 90 |
| Bentonite Clay | 3 to 9 |
| Synthetic Fibers | 0.05 to 2 |
| Portland Cement | 5 to 30 |
| Latex Paint | 1 to 8 |

TABLE 26

Another Typical Content of a Cover Composition Prior to Application According to One Aspect of the Invention with Latex Paint

| Constituent | Quantity |
| --- | --- |
| Liquid | 6,000-12,000 pounds |
| Bentonite Clay | 250-750 pounds |
| Synthetic Fibers | 10-100 pounds |
| Portland Cement | 500-4,000 |
| Latex Paint | 50-1000 pounds |

According to one aspect of the invention, one or more of the cover compositions listed in Tables 1-26 may be provided. However, other aspects of the invention include the constituents that may be mixed with the liquid and fibers listed in Tables 1-26 to provide the cover compositions. For example, one aspect of the invention comprises a material that can be mixed with a liquid to provide at least a constituent of a cover composition, the material comprising a mixture of any one of the constituents listed in Tables 1-26, among others, without the addition of the liquid and synthetic fibers listed. For instance, with reference to the constituents listed in Tables 8-11, one aspect of the invention may be a material comprising bentonite clay and at least some pregelatinized wheat starch, for example, a material comprising at least 80 weight percent bentonite clay and at least 1 weight percent pregelatinized wheat starch. In one aspect, the material may comprise about 80 to about 99 weight percent bentonite clay and about 1 to about 20 weight percent pregelatinized wheat starch. In another aspect, the material may comprise about 90 to about 99 weight percent bentonite clay and about 1 to about 10 weight percent pregelatinized wheat starch. With reference to the constituents listed in Tables 18-22, one aspect of the invention may be a material comprising bentonite clay, and at least some pregelatinized wheat starch, and at least some soda ash, for example, a material comprising at least 80 weight percent bentonite clay, at least 1 weight percent pregelatinized wheat starch, and less than 1 weight percent soda ash. In one aspect, the material may comprise about 80 to about 98 weight percent bentonite clay, about 0.05 to about 5 weight percent pregelatinized wheat starch, and about 0.05 to about 5 weight percent soda ash. In another aspect, the material may comprise about 90 to about 98 weight percent bentonite clay, about 0.05 to about 2 weight percent pregelatinized wheat starch, and about 0.05 to about 2 weight percent soda ash. In other aspects, the material may also include one or more of synthetic fibers, a synthetic polymer, and a coloring agent, as discussed above. One aspect of the invention comprises a material marketed under the trademark PSM-200™ setting agent by Landfill Service Corporation, for example, the material may be provided in 50 pound bags for ease of shipment and handling.

According to aspects of the invention, the constituents listed above, for example, in Tables 1-26, may be mixed in any convenient fashion. However, in one aspect, the liquid, clay, and synthetic fibers may be mixed first, for example, water, bentonite clay in the form of PSM-200 ™ setting agent, and P-100 fibers may be mixed first. The mixture may be mixed continuously with a mixing agitator while the ingredients are added. Typically, the mixing agitator may be activated for approximately a minute or longer to adequately mix the liquid, clay, and fibers together. Cement may then be added to the mixture of liquid, bentonite clay, and fibers. In one aspect, the mixture of liquid, bentonite clay, and fibers may be allowed to thicken to form a viscid slurry, for instance, whereby the viscosity of the mixture increases by at least 10%, for example, to a viscosity that resembles a cake batter, before adding additional ingredients. After thickening, in one aspect, the optional ingredients, cement and/or pregelatinized wheat starch and/or a coloring agent and/or soda ash, and/or latex paint may be added. Again, the mixing agitator may be activated for approximately a minute or longer to adequately mix the optional ingredients.

The mixing time necessary to yield a mixture with the proper consistency may vary depending upon the percentage of each constituent added to the mixture. Also, weather conditions, such as, temperature and humidity, may affect the percentage of cement mixed with the liquid, bentonite clay, and fibers. However, the materials may be mixed until the mixture has a thick, viscid, "milk shake" type consistency.

Once mixed, the composition may continue to be agitated, for example, slowly agitated, for instance, by means of a commercial mixing device, such as a Landfill Service Corporation PSA 2000 Applicator mixer, or its equivalent. If the composition requires transport to the point of application, the mixture may be agitated during transport.

Though the size of the pile to which the composition is applied may vary broadly, applied according to aspects of the invention, municipal solid waste piles in landfills may be relatively large. Therefore, it may be necessary to cover a large area of the surface of these piles using the cover material in accordance with the present invention. According to one aspect, the cover may be distributed by an apparatus that is capable of applying the cover composition to a large area, for example, spraying on a large area, though smaller areas may also be covered with the material. For example, the area that can be covered with the composition according to aspects of the invention may vary from 100 square feet to 50 acres, and is typically between about 5000 square feet and about 2 acres.

In one aspect of the invention, a distribution system may be provided which is capable of mixing and applying large volumes of the composition. A typical application apparatus may include a mixing tank having an agitator into which the ingredients (that is, the constituents) of the material cover can be introduced and mixed; a pump capable of passing a high content of solid material, for example, a slurry pump; and a conduit or hose with a nozzle to distribute the pumped slurry. The capacity of the mixing tanks may range from about 500 gallons to about 5,000 gallons. Typically, the agitator and pump may be powered by a diesel or gasoline engine. The entire application apparatus may be mounted on a trailer that could be towed by a truck or other powered means. Alternatively, the application apparatus may be mounted on the bed of a truck or mounted on a track unit to be guided to different areas of, for example, a landfill. Although the cover material for waste piles may be effectively mixed and applied using application equipment, it is possible to mix the ingredients and distribute the composition to form the cover material in other types of mixing equipment which have a sufficient mixing and spraying capacity.

The composition may be applied to the material pile by conventional means, for example, by spraying with a conventional spray applicator, such as, as Posi-shell® PSA 2000™ Applicator provided by Landfill Service Corporation; a Bowie ADCM Applicator; or with common commercial hydro-seeding equipment, such as, the Bowie Lancer 600 Hydromulcher, or their equivalent. The composition or mixture may be applied onto the pile surface using a motion similar to spray painting. In one aspect, the composition may be applied to the material pile whereby the wet mixture is applied in a substantially uniform layer of at least about ⅛ inch thick, for example, about ⅛ inch to about 1 inch thick, for instance, from about ⅛ inch to about ⅜ inch thick.

Unlike prior art compositions, for example, compositions disclosed in U.S. Pat. Nos. 5,082,500 and 5,516,830, aspects of the present invention exhibit improved adhesion to, for example, landfill refuse, in particular, plastics, and improved cohesion to itself whereby substantially uniform coverage of the refuse may be provided. That is, contrary to prior art formulations which have exhibited poor adhesion to refuse and thus tend to "slide off" leaving the refuse exposed, the improved adhesion qualities of aspects of the invention typically minimize or prevent undesirable exposure or inconsistencies in the cover.

During or after the entire surface area of the waste pile has been covered, the material may be allowed to harden. According to aspects of the invention, when the mixture is applied it will resemble a clotty coagulant type of material which will adhere to the waste pile and cohere to itself. Typically, the material will dry and harden to resemble a stucco-type finish within 24 hours. When no cement is present in the mixture, the composition may air dry in about 8 to about 24 hours. When cement is present in the mixture, the composition may harden faster, for example, harden in about 2 to about 6 hours. When a coloring agent is provided, such as mortar dye, the aesthetic appearance of the bulk material pile may also be enhanced. For example, aspects of the invention may provide a uniform color to a refuse or other material pile, for example, that replaces an unsightly exposed waste pile.

After the waste pile has been sufficiently covered, the applicator and mixing unit may be cleaned out thoroughly when not in use so that the mixture remaining within the apparatus does not harden. Typically, water will suffice in cleaning the apparatus. For convenience, cleaning may occur directly on the landfill or other facility.

The exact percentage of each constituent (that is, liquid, clay, fibers, etc.) used to create the composition or mixture may depend upon the weather conditions that exist during mixing and application of the cover composition. For example, at relatively higher temperatures, the amount of liquid used in the total mixture may be greater than the amount of liquid used at lower temperatures. However, the total amount of liquid used within the mixture may be between about 80 and about 95 weight percent without cement and about 50 to about 85 weight percent with cement, depending upon weather variations. Therefore, for example, on a relatively hot day, the amount of liquid used may be closer to about 90 weight percent (without cement) or about 80 weight percent (with cement) of the mixture. However, on a cold day, the amount of liquid may be closer to about 85 weight percent (without cement) or about 60 weight percent (with cement) of the mixture. Also, if rain is falling or expected that will contact the composition or mixture, then the amount of liquid in the composition may be decreased accordingly.

When cement is used, the amount of cement in the mixture may also be higher on a cold or wet day compared to the amount of cement used in the mixture on a hot or dry day. However, despite variations in rainfall and temperature, the amount of cement may remain between about 10 and about 40 weight percent of the total weight of the mixture. Therefore, on a hot, dry day, the amount of cement may be closer to about 10 weight percent of the total mixture, and on a cold, wet day, the amount of cement may be closer to about 40 weight percent of the total mixture. The amount of synthetic fiber used may also be dependent upon weather conditions. Though the amount of synthetic fiber may be between about 0.1 and about 1.0 weight percent of the mixture, on a day where rain is falling or predicated, the amount of synthetic fiber may be closer to about 1.0 weight percent. In one aspect, the higher the rainfall, the higher the amount of synthetic fiber used in the composition.

The hardened composition provided by aspects of the invention may form a durable cover or membrane over the bulk material pile that minimizes or prevents the emission of odor from the pile; minimizes or prevents the potential for fires; minimizes or prevents the movement of the waste, for example, due to wind or precipitation; and minimizes or prevents vectors, such as birds, flies, and other insects, from feeding on the contents of the pile. Aspects of the invention may comprise a "daily" or "interim" cover to a refuse pile, that is, a cover that is buried by new refuse after a predetermined period, for example, over night. Aspects of the invention may also be used for long-term cover of a refuse pile, for example, aspects of the invention may provide a base upon which soil may be applied and grass or other covering plants planted.

In addition, according to an aspect of the invention, areas of the cover which deteriorate, are disrupted, or exposed, for example, by the addition of further material to an existing pile, may be recovered by spraying additional composition on the deteriorated, exposed, or disrupted area.

Again, though aspects of the invention were described for illustrative purposes for use with landfill refuse, it is understood that aspects of the present invention may be applied to any accumulation or pile of material, including waste, stockpiles of sand, mulch, coal, topsoil, contaminated soil, and cement, among others.

While several aspects of the present invention have been described herein, alternative aspects may be conceived by those skilled in the art to accomplish the same or equivalent objectives. Accordingly, it is intended by the appended claims to cover all such alternative aspects as fall within the true spirit and scope of the invention.

The invention claimed is:

1. A bulk material cover composition comprising:
   greater than 60 weight percent liquid;
   about 3 to about 18 weight percent bentonite clay;
   at least some cement; and
   at least some synthetic fiber.

2. The composition as recited in claim 1, wherein the liquid comprises about 80 weight percent to about 95 weight percent liquid.

3. The composition as recited in claim 1, wherein the synthetic fiber comprises about 0.05 weight percent to about 2 weight percent synthetic fiber.

4. The composition as recited in claim 1, wherein the at least some cement comprises about 5 to about 45 weight percent Portland cement.

5. The composition as recited in claim 1, wherein the liquid comprises greater than 60 weight percent to about 90 weight percent water; wherein the bentonite clay comprises about 3 to about 12 weight percent bentonite clay; wherein the at least some cement comprises about 5 to about 45 weight percent bentonite clay; and wherein the synthetic fiber comprises about 0.05 to about 2 weight percent synthetic fiber.

6. The composition as recited in claim 1, further comprising a synthetic polymer.

7. The composition as recited in claim 1, wherein the liquid comprises about 9,000 pounds to about 18,000 pounds of water; wherein the bentonite clay comprises about 500 pounds to about 1,500 pounds of bentonite clay; wherein the synthetic fiber comprises about 10 pounds to about 200 pounds of synthetic fibers; and wherein the cement comprises about 500 to about 15,000 pounds of cement.

8. The composition as recited in claim 1, further comprising an adhesive agent.

9. The composition as recited in claim 8, wherein the adhesive agent comprises wheat starch.

10. The composition as recited in claim 9, wherein the wheat starch comprises pregelatinized wheat starch.

11. The composition as recited in claim 10, wherein the pregelatinized wheat starch comprises about 0.10 weight percent to about 2 weight percent pregelatinized wheat starch.

12. The composition as recited in claim 1, further comprising a coloring agent.

13. The composition as recited in claim 12, wherein the coloring agent comprises mortar dye.

14. The composition as recited in claim 13, wherein the mortar dye comprises about 0.05 weight percent to about 2 weight percent mortar dye.

15. The composition as recited in claim 1, further comprising soda ash.

16. The composition as recited in claim 1, wherein the soda ash comprises about 0.05 weight percent to about 4 weight percent soda ash.

17. The composition as recited in claim 1, further comprising latex paint.

18. The composition as recited in claim 17, wherein the latex paint comprises about 1 weight percent to about 10 weight percent latex paint.

19. A method of providing a cover to a bulk material pile, the method comprising:
   providing the cover composition recited in claim 1;
   spraying the composition onto the bulk material pile; and
   allowing the composition to harden to provide a cover to at least some of the bulk material pile.

20. The method as recited in claim 19, wherein the method further comprises, prior to spraying, introducing at least some synthetic polymer to the composition.

* * * * *